Oct. 12, 1965　　　　　G. R. WALLMANN　　　　　3,210,807
WINDOW UNIT
Filed June 27, 1963　　　　　　　　　　　　　　8 Sheets-Sheet 1
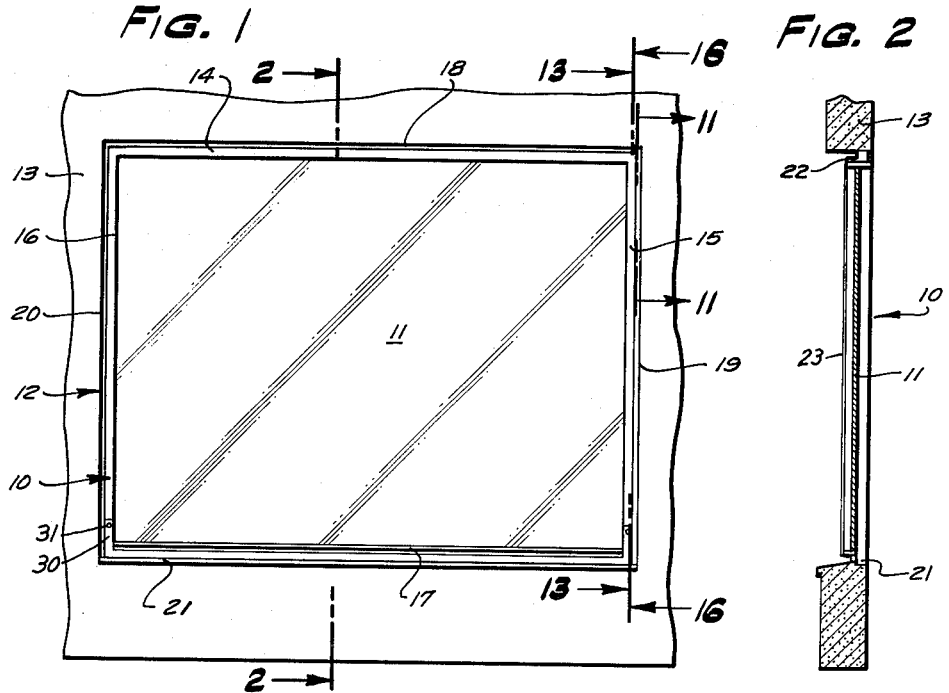
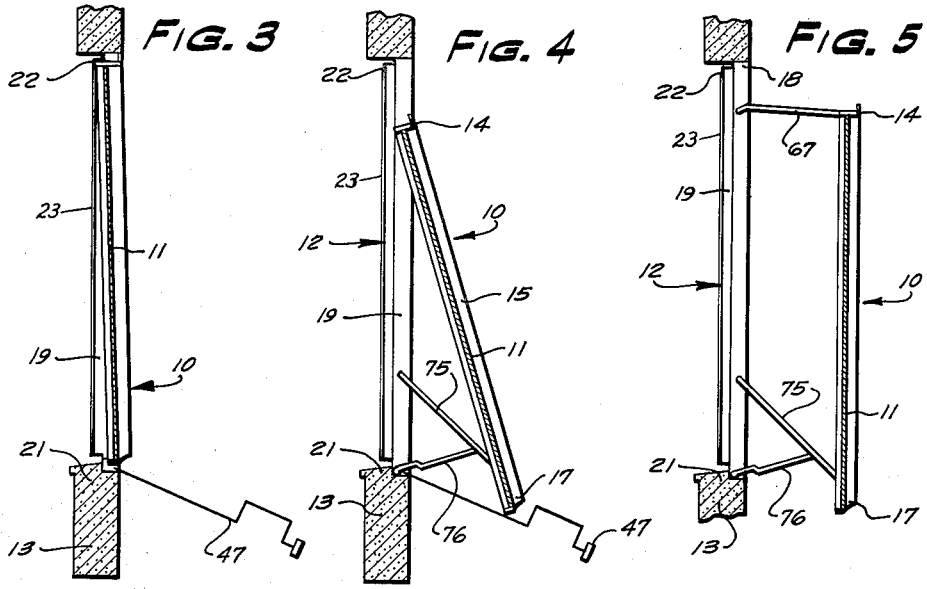
GEORGE R. WALLMANN,
INVENTOR.
BY
BUCKHORN, CHEATHAM & BLORE
ATTORNEYS

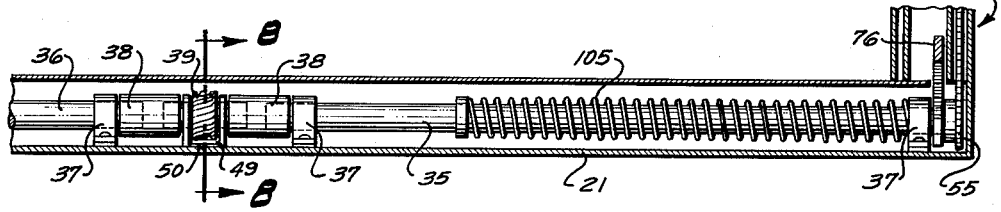
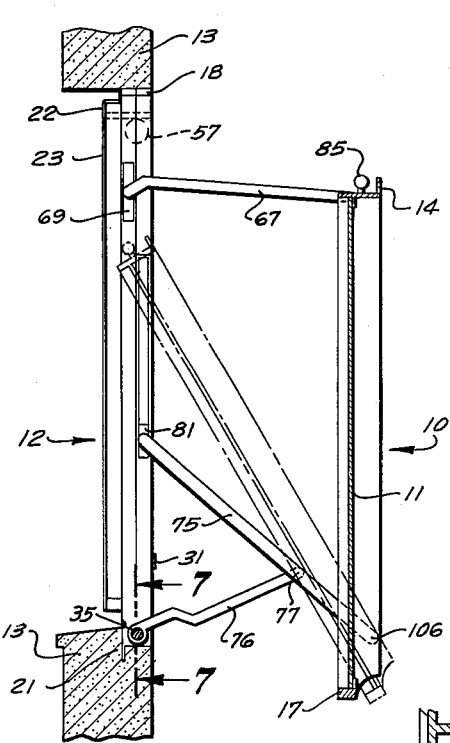
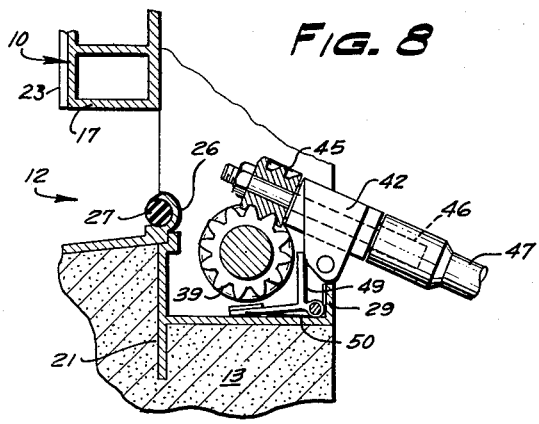
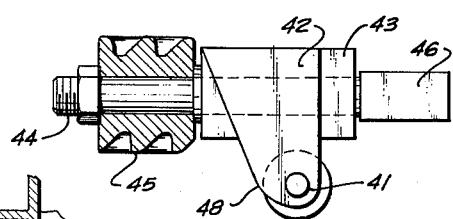
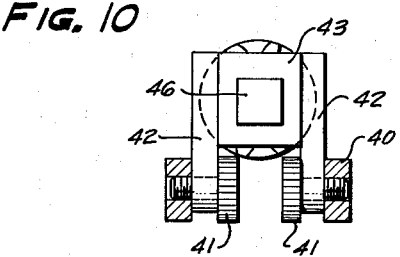

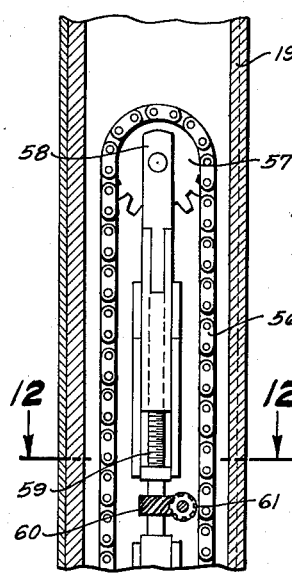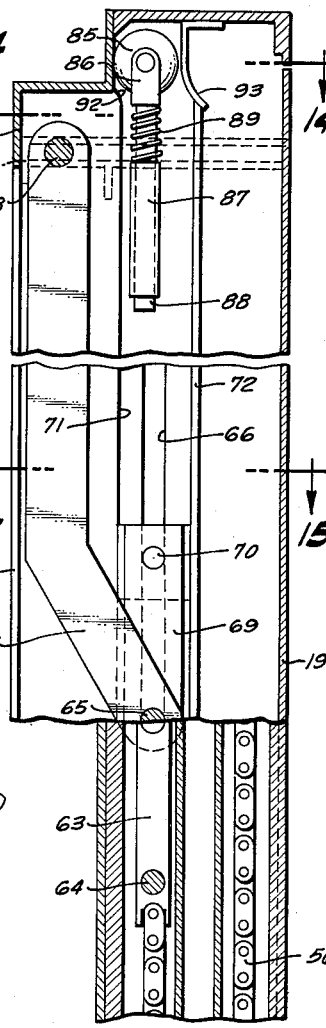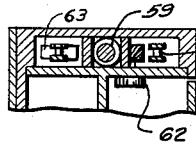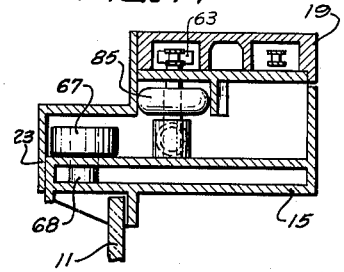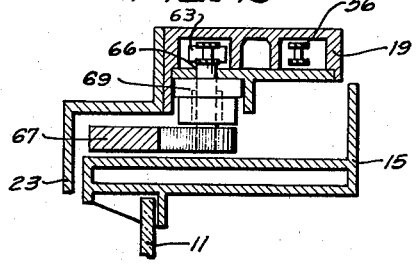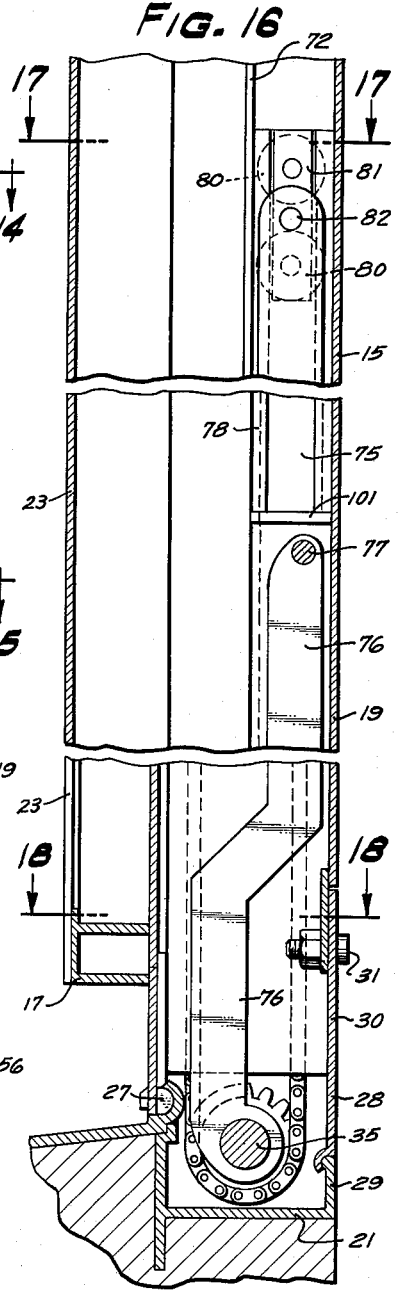
GEORGE R. WALLMANN,
INVENTOR.
BY
BUCKHORN, CHEATHAM & BLORE
ATTORNEYS Oct. 12, 1965
G. R. WALLMANN
3,210,807
WINDOW UNIT
Filed June 27, 1963
8 Sheets-Sheet 4
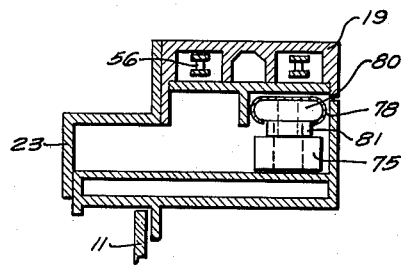
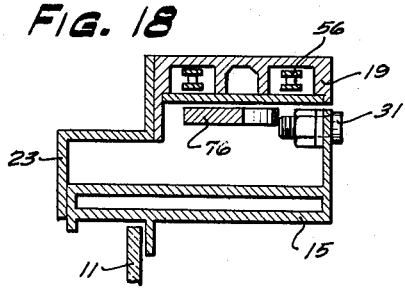
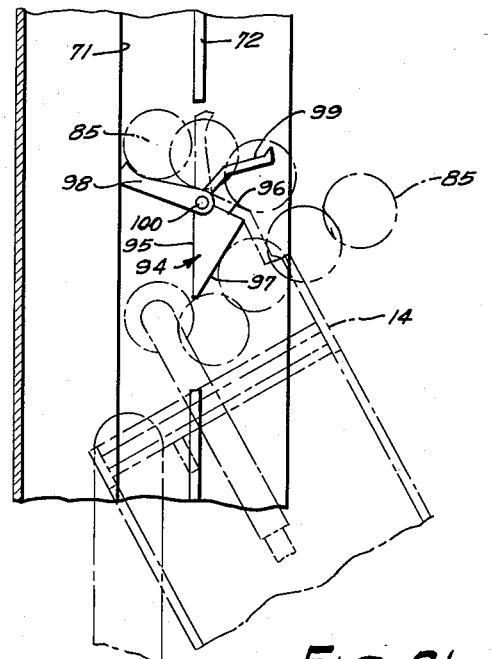
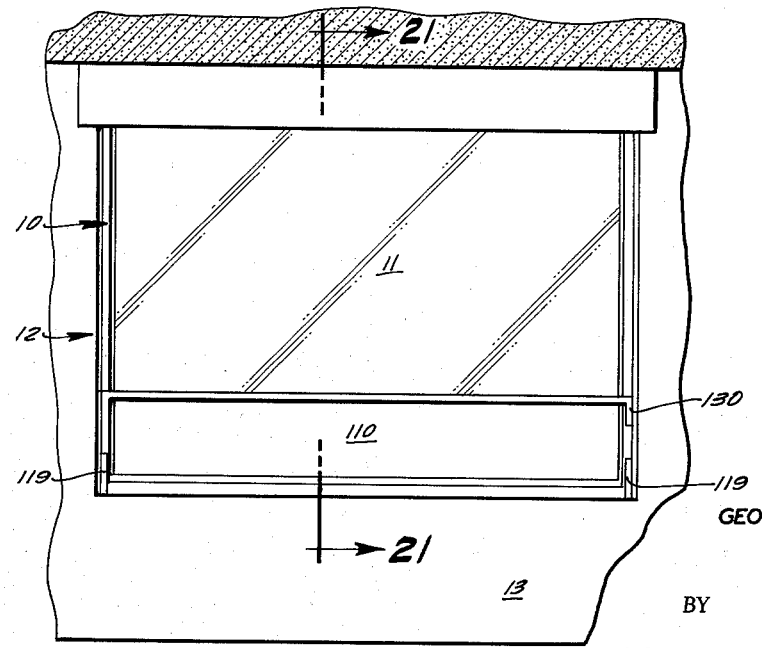
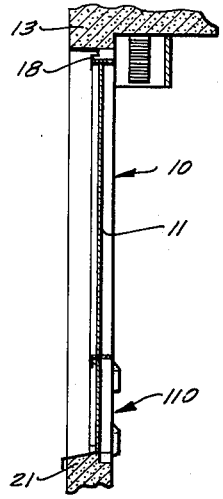
GEORGE R. WALLMANN,
INVENTOR.
BY
BUCKHORN, CHEATHAM & BLORE
ATTORNEYS Oct. 12, 1965        G. R. WALLMANN        3,210,807
WINDOW UNIT Filed June 27, 1963        8 Sheets-Sheet 5

GEORGE R. WALLMANN,
INVENTOR.

BY

BUCKHORN, CHEATHAM & BLORE
ATTORNEYS

Oct. 12, 1965  G. R. WALLMANN  3,210,807
WINDOW UNIT
Filed June 27, 1963  8 Sheets-Sheet 6

GEORGE R. WALLMANN,
INVENTOR.

BY

BUCKHORN, CHEATHAM & BLORE
ATTORNEYS

Oct. 12, 1965  G. R. WALLMANN  3,210,807
WINDOW UNIT
Filed June 27, 1963                                     8 Sheets-Sheet 7
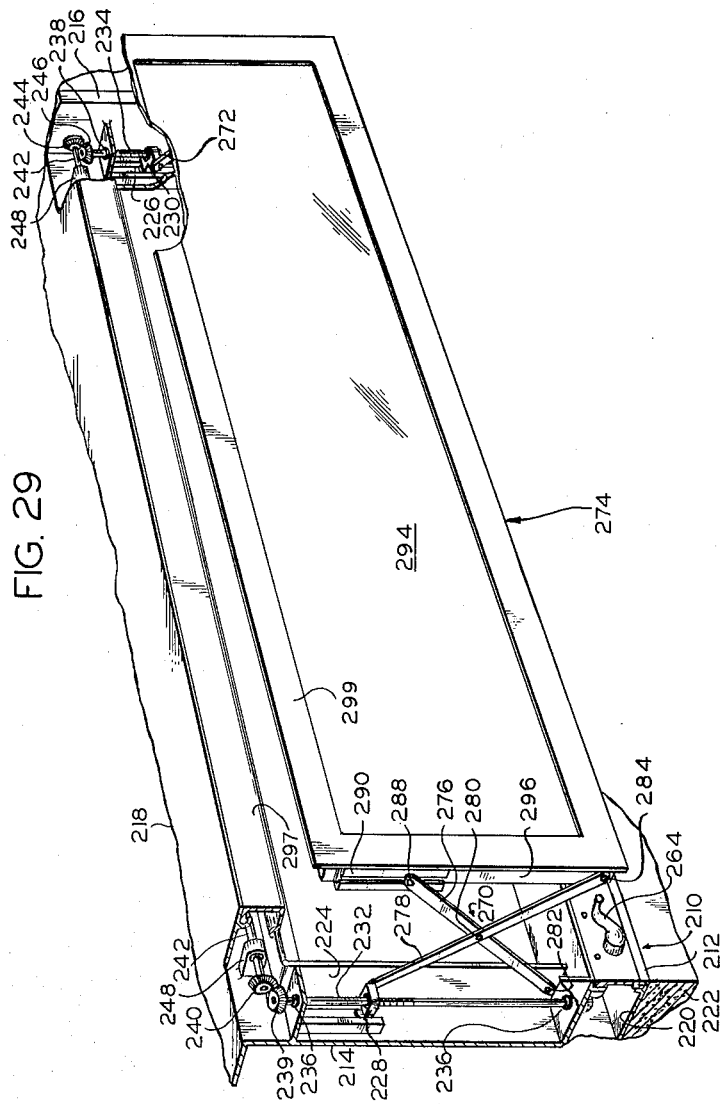
INVENTOR.
GEORGE R. WALLMANN
BY
BUCKHORN, BLORE, KLARQUIST & SPARKMAN
ATTORNEYS

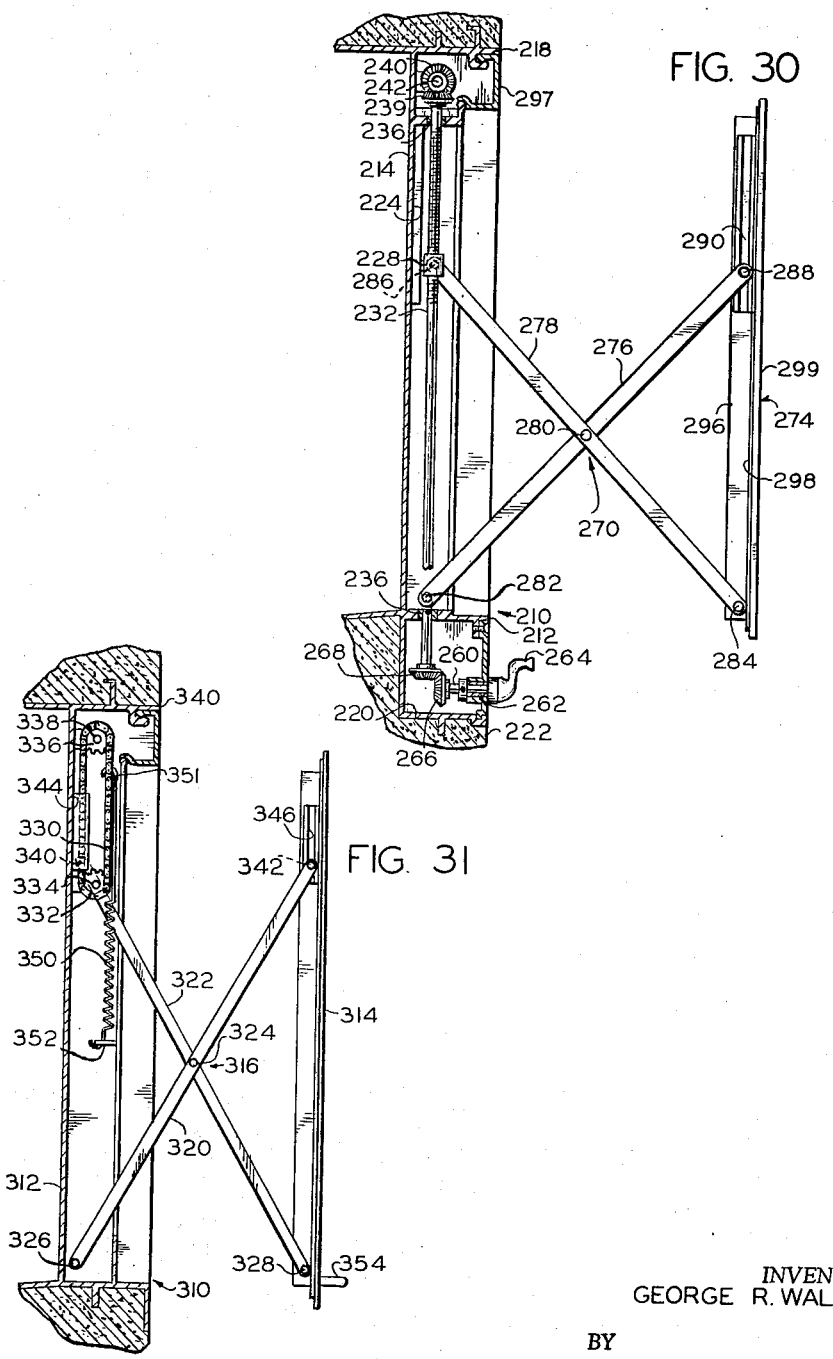

United States Patent Office 3,210,807
Patented Oct. 12, 1965

3,210,807
WINDOW UNIT
George R. Wallmann, 1930 Onyx St., Apt. 2,
Eugene, Oreg.
Filed June 27, 1963, Ser. No. 291,193
13 Claims. (Cl. 20—42)

This is a continuation-in-part of my copending application, Serial No. 189,577, filed April 23, 1962, now abandoned.

My present invention comprises a window unit for a wall, the invention providing means whereby a large "fixed" sash may be bodily moved into the room and held in an upright position spaced from the wall so that the exterior surface of the window pane may be cleaned by a person standing within the room.

The modern trend is for all windows to incorporate a single, large, unobstructed pane, whereby the amount of light admitted to the room is at a maximum for the window space, and washing of the pane is facilitated. The present invention is particularly useful in large office buildings, hospitals or the like where it is undesirable and dangerous to have a window washer wash the exterior surfaces of the window by means of scaffolding, elevators, safety straps and the like. Heretofore, in order to avoid the necessity of exterior washing operations, it has been customary to divide a large window into sections. For example, a window approximately ten feet wide would have a central mullion, and would be provided with four swinging windows mounted so that a person standing within the room could reach the limits of the opened window panes. Such constructions are expensive, and involve the use of centrally pivoted windows so that the workman's arm could be inserted between the sash and the window frame, or between the mullion and the sash. Such constructions involve problems of weatherproofing, since some portions of the window frame overlap inner surfaces of the sash frame and other portions overlap outer portions of the sash frame. Other constructions involving the use of pivoted bracket arms to swing the entire sash outwardly displace the sash so far outwardly that each sash must be held to a narrow width. The present invention respects good design in weatherproofing.

A further object of the present invention is to provide a construction of the foregoing character in which the object is to displace the sash bodily inwardly of a room, with which such operation can be accomplished without the necessity of removing Venetian blinds or valances overlapping the top of the sash, and with which radiators or the like placed along the wall below the window do not provide any problem.

A further object of the present invention is to provide a construction of the foregoing character which is easy to manufacture, assemble, mount in a wall, and operate.

Another object of the invention is to provide a sash carried at opposite sides by parallel arms interlocked for movement together to prevent twist of the sash.

Still another object of the invention is to provide a window unit having a sash carried between a closed position and an open position by a pair of lazy tongs connected to opposite edges of the sash and drivingly interconnected so that the tongs are always extended, or contracted, to the same extent.

Further objects and advantages of the present invention will be more readily apparent from inspection of the following specification taken in connection with the accompanying drawings, wherein like numerals refer to like parts throughout.

In the drawings,

FIG. 1 is a front elevation of a window unit positioned in a wall and constructed in accordance with the present invention;

FIG. 2 is a vertical section taken substantially along line 2—2 of FIG. 1;

FIG. 3 is a view similar to FIG. 2 showing the initial opening operation;

FIG. 4 is a similar view showing the window partially open;

FIG. 5 is a similar view showing the window fully opened;

FIG. 6 is an enlarged view similar to FIG. 5;

FIG. 7 is a partial vertical section, on an enlarged scale, taken substantially along line 7—7 of FIG. 6;

FIG. 8 is a partial vertical section, on an enlarged scale, taken substantially along line 8—8 of FIG. 7, showing the operating crank in position;

FIG. 8a is a view similar to FIG. 8, showing the sill plate in position;

FIG. 9 is a detail view showing a portion of the window operating crank means;

FIG. 10 is an end view of FIG. 9;

FIG. 11 is a partial vertical section, on an enlarged scale, taken substantially along line 11—11 of FIG. 1;

FIG. 12 is a partial vertical section taken substantially along line 12—12 of FIG. 11;

FIG. 13 is a vertical section, on an enlarged scale, taken along a broken vertical line 13—13, as indicated in FIG. 1;

FIG. 14 is a horizontal section taken substantially along line 14—14 of FIG. 13;

FIG. 15 is a horizontal section taken substantially along line 15—15 of FIG. 13;

FIG. 16 is a vertical section, on an enlarged scale, taken substantially along line 16—16 of FIG. 1;

FIG. 17 is a horizontal section taken substantially along line 17—17 of FIG. 16;

FIG. 18 is a horizontal section taken substantially along line 18—18 of FIG. 16;

FIG. 19 is a vertical section, on an enlarged scale schematically showing the action of a switch means of the present invention;

FIG. 20 is an elevational view, similar to FIG 1, of a modified form of window;

FIG. 21 is a vertical section taken substantially along line 21—21 of FIG. 20;

FIG. 29 is a partially sectional, perspective view of a window unit forming an alternate embodiment of the invention;

FIG. 30 is an enlarged fragmentary vertical sectional view of the window unit of FIG. 29; and FIG. 31 is an enlarged, fragmentary, vertical sectional view of a window unit forming an alternate embodiment of the invention.

Figure 22:
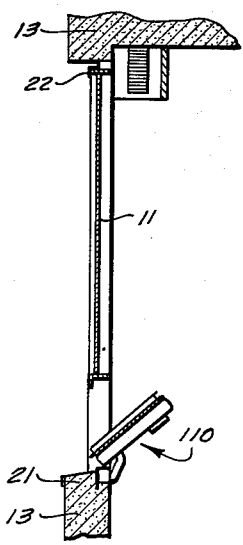
FIG. 22 is a similar view showing a preliminary step in the operation of the window.
Figure 23:
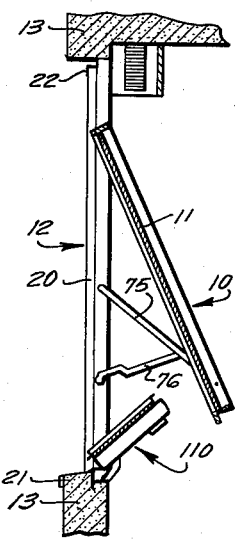
FIG. 23 is a similar view showing the window partly opened.
Figure 24:
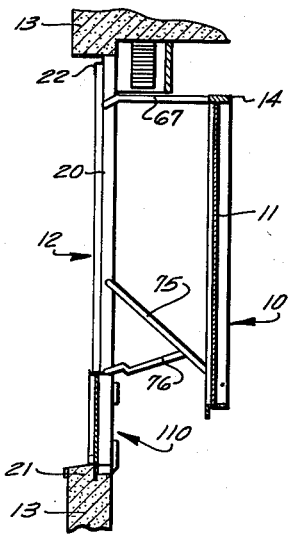
FIG. 24 is a similar view showing the window fully opened.

Referring to FIGS. 1 to 19 inclusive, a sash 10 mounting a large pane 11 is shown mounted in a window frame 12 associated with the wall 13 of a room. The sash frame comprises a rectangular frame having a top 14, sides 15 and 16, and a bottom 17, and the window frame comprises a rectangular frame having a top 18, sides 19 and 20, and a bottom or sill portion 21. The top 18 of the window frame includes a vertical flange 22 and the sides 19 and 20 include flanges 23 adapted to engage respectively the outer surfaces of the top 14 and sides 15 and 16 of the sash frame when the window is closed, thereby sealing the opening on three sides against the elements. The sill portion 21 includes a removable sill plate 24 having a vertical flange 25 which lies flush against the inner surface of the lower portion 17 of the sash frame to complete the sealing of the window opening (FIG. 8). The bottom part 21 of the window frame includes an upwardly extending flange 26 mounting a gasket 27, against which a downwardly extending flange on the sill plate 24 is seated to seal the junction between the bottom part of the sash frame and the removable sill plate. The front edge of the sill plate includes a depending flange 28 (FIG. 16) extending the length of the sill plate and which is provided to interlock with the upper edge of an upwardly extending flange 29 on the bottom portion 21 of the window frame. At each end the sill plate is provided with a vertically extending part 30 which overlaps a portion of the respective side part of the window frame, and a pair of screws 31 joins the overlapping portions so as to hold the removable sill plate in position (see FIG. 1). Gasket strips (not shown) may be fixed to the flanges 22, 23 and 25 if desired. As long as the sash is locked by the sill plate, the window cannot be opened.

The lower portion of the window frame provides an elongated enclosure to conceal a pair of operating shafts 35 and 36 extending in longitudinal alignment with each other from near the center to end points beneath the side portions. The shafts are rotatably mounted in pillow blocks 37, a pair of which are near the center of the sill, and their adjacent ends are connected together by couplings 38 supporting an intervening worm gear 39 (FIGS. 7 and 8). The flange 29 is provided, at its central portion, with a pair of brackets 40 (FIG. 10) provided with laterally extending screw-threaded openings in which may be engaged a pair of oppositely extending thumb screws 41. The thumb screws are mounted in downwardly depending flanges 42 on a bearing block 43 which rotatively mounts the shaft 44 of a worm driver 45 forming part of an independent crank means which may be carried from window to window in order to operate the windows, as will appear. The shaft 44 is fixed at its opposite end to a rectangular plug 46 adapted to fit in a driver socket in the end of an elongated crank 47. The flanges 42 are provided with cam shaped forward edges 48 adapted to engage and rock forwardly a ratchet stop member 49 which is normally urged into locking engagement with the worm gear 39 by a spring 50. When the sill plate has been removed the thumb screws 41 may be engaged, whereupon the crank 47 is fitted to the plug 46 and tilted upwardly to throw the ratchet stop out of engagement with the driven worm gear 39 so that the shafts 35 and 36 may be rotated by the crank, simultaneously and coextensively in the appropriate direction.

Sprocket chain means are mounted in each of the side portions 19 and 20 of the window frame, each comprising a sprocket 55 fixed to its respective shaft and driving a sprocket chain 56 trained thereabout and about a sprocket 57 in the upper portion of the side part of the frame (FIG. 11). The sprocket 57 is mounted in a clevis 58 which is fixed to the upper end of an adjusting screw 59 vertically mounted on the frame and fixed to a driven worm gear 60. The screw 59 may therefore be rotated by a driving worm gear 61 mounted on a transverse axis within the frame and fixed to a socket head 62 projecting from the frame (FIG. 12) whereby the screw 59 may be rotated to provide or take up slack in the sprocket chain 56 for assembly purposes.

A bar 63 (FIG. 13) provides a long link in an intermediate point of one flight of the chain 56, the bar being provided with a lateral guide pin 64 and a pivot pin 65 which projects through a vertical slot 66 in the side portion of the window frame. The pivot pin 65 projects into the space between the sash and the window when the window is closed, and pivotally engages the lower end of a pusher link 67 which extends vertically between the window and the sash. The lower end of the link is offset so that the major portion of the pusher link lies alongside of the flange 23 when the window is closed. The upper end of the link is pivotally connected by a pivot 68 to the upper portion 14 of the sash frame.

The lower pivot 65 is connected to a slide 69 extending upwardly above the pivot 65 and provided with a guide pin 70 which also engages the slot 66. The slide is confined between a flange surface 71 on the window frame and an intermediate rib 72 on the frame, the pins 65 and 70, the surface 71 and the rib 72 providing guide means for guiding the slide 69 vertically as urged by the sprocket chain 56.

Adjacent the lower opposite sides of the unit there are provided a pair of scissors linkages, each comprising a link 75 and a link 76. The lower end of the link 76 (FIG. 16) is pivotally mounted on the drive shaft 35 (or 36 as the case may be). The link extends upwardly at one side of the frame, then angles inwardly, and then extends vertically upward and is connected by a pivot 77 to an intermediate portion of the upper scissors link 75. Mounted on the opposite side of the rib 72 from the slide 69 there is a track 78 provided with curved flanges which engage a pair of wheels 80 mounted on a vertically movable glide 81. The upper end of the link 75 is pivotally connected to glide 81 through a pivot 82.

Mounted at each upper corner of the sash frame is a guide wheel 85. Each guide wheel is guided between the vertical surface 71 and the rib 72 and is carried on a clevis 86, the stem of which is mounted in a vertical socket member 87 on the sash frame. The stem is retained by a pin 88 which permits downward sliding movement of the clevis, which downward movement is opposed by a spring 89 biased between the clevis and the socket member and surrounding the clevis stem.

When the crank 47 is initially operated in one direction to lower the slide 69 the link 67 exerts a downward pressure on the sash frame through the upper pivot 68. The upper portion of the sash frame is guided for vertical movement by the guide wheel 85 and its track means 71 and 72. In the first part of the downward movement the sash frame is shoved slightly inward of the room by an offset upper part 92 of the surface 71 and a curved upper part 93 of the rib 72 (FIG. 13) which causes the sash to move slightly inward and releases the friction between the sealing flanges and the sash frame. This downward pressure on the sash frame causes the bottom portion of the sash to move inwardly, and the glide 81 to move whereby the scissors linkage is extended, as seen in FIG. 6. The downward movement of the top of the sash continues until the guide wheel reaches a break in the rib 72, in the center of which there is provided an island 94 having a vertical outer surface 95, an inwardly inclined upper surface 96, and an inwardly inclined lower surface 97 (FIG. 19). A switch member having a heavy, outer leg 98 and a light, inner leg 99 is pivoted on a pivot 100 adjacent the upper corner of the island 94, the mass of the switch member being such that the leg 98 normally lies across the path of the wheel 85 with its upper end resting against the flange surface 71. During the last portion of the downward movement of the slide 69 the guide wheel 85 is thereby shunted free of the window frame and into the room, causing the top of the sash to move slightly inward. At this point the glide 81 strikes an abutment member 101 positioned across the track 78 (FIG. 16), thereby preventing further rotation of the crank in the initial direction.

During the initial rotation of the drive shaft 35 (and 36) a pair of springs 105 coiled about the shafts, fixed to the shafts at one end and to the pillow blocks 37 at their other ends, are tensioned to counter the weight of the sash during its outward and downward movement.

The movement of the crank 47 is now reversed, which exerts an upward force on link 67. Because pivot 77 is locked in position by the weight of the sash, and since the restraint against lateral movement of guide wheel 85 has been removed, the upward force produces rotation of the sash about the pivot 106 (FIG. 6) which connects the lower end of link 75 to the lower portion of the sash frame, until the link 67 is substantially horizontal and the sash has assumed a vertical position spaced inwardly from the wall.

In returning the sash to the closed position, the initial operation, as in the opening movement, is to operate the hand crank so as to effect a downward force on slide 69. This pulls the top of the sash toward the window frame. When the guide wheel 85 engages the downwardly inclined surface 97 of the switch island 94, the wheel is depressed due to the yielding and compression of spring 89 until the wheel passes beneath the lower point of the island and is projected upwardly by the spring 89 into the space between surfaces 71 and 95. The direction of rotation of the crank 47 is then reversed so as to raise the slide 69. This forces the top of the sash to move vertically upward as guided by the guide wheel 85, which is now retained in its vertical guide means. At the same time the pivot 106 at the lower portion of the sash is lifted upwardly, causing the glide 81 to move vertically in its guide means and collapsing the scissors linkage into the space between the window frame and the sash. At the last instant the offset portion 93 of the rib 72 moves the top of the sash frame into sealing engagement with the flange 22. The crank means may now be removed and the sill plate reinstalled.

In the previously described first modification of the invention the removable sill plate 24 constitutes a movable means for unlocking the sash frame and permitting application of the crank 47 to the driving mechanism. In the modification disclosed in FIGS. 20 to 28, inclusive, the same general principles are involved in a window unit having a hopper ventilator 110 associated therewith, the movable means of the first unit being replaced in the second unit by a different type of movable means of which the hopper ventilator 110 provides the means to lock the lower edge of the sash frame in position and to seal the lower edge of the window sash, and a removable sill plate 111 is provided at the bottom of the unit to seal the lower edge of the hopper ventilator in closed position and to permit access to the driving mechanism so that the crank 47 may be applied as before.

Figure 25:
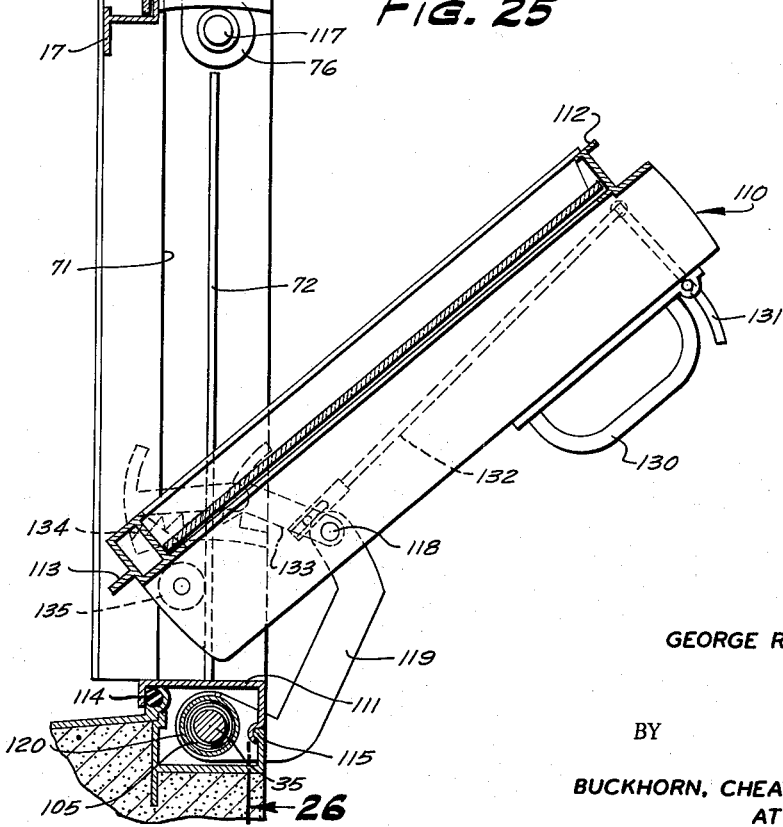
FIG. 25 is a partial, vertical section, on an enlarged scale, taken along line 25—25 of FIG. 26, showing the preliminary step in operating the window.
Figure 27:
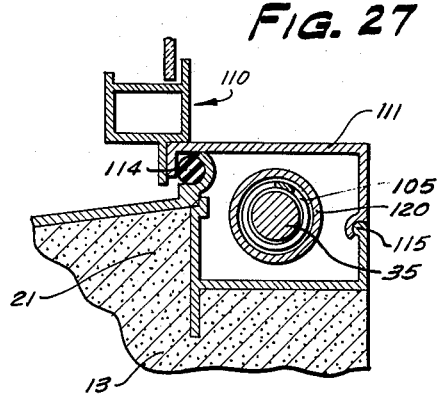
FIG. 27 is a vertical section taken substantially along line 27—27 of FIG. 26.
Figure 26:
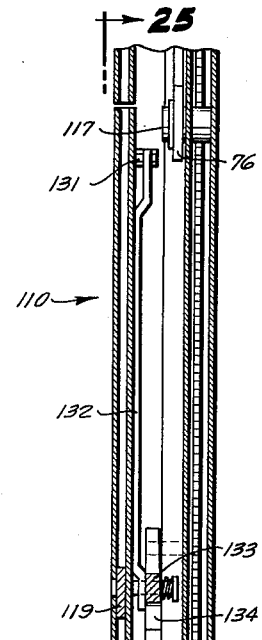
FIG. 26 is a vertical section taken substantially along line 26—26 of FIG. 25.
Figure 28:
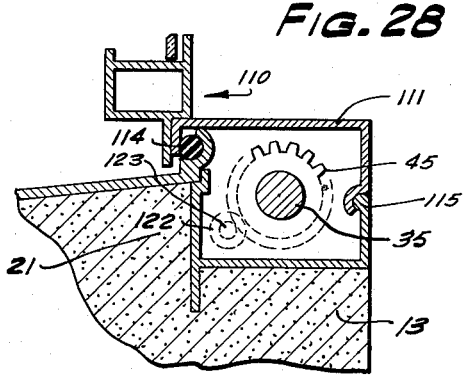
FIG. 28 is a vertical section taken substantially along line 28—28 of FIG. 26.

Referring to FIG. 25, it will be seen that the hopper ventilator comprises an upper flange 112 which is adapted to seal against the depending flange 17 of the sash frame 10 as previously described. The lower edge of the hopper ventilator is provided with a depending flange 113 which is adapted to seal against a portion of the removable sill plate 111 when the ventilator unit is closed. The sill plate 111 has a flange compressed against a gasket 114, and an interlocking flange 115 at the front as previously described. In this modification the lower link 76 of the scissors linkage is mounted upon a pivot 117 mounted in the window frame at an elevation above the bottom of the window unit, but the driving mechanism and the operation of the linkages is as previously described.

In order to unlock the sash frame and to permit the removable sill plate 111 to be removed, the hopper ventilator is opened as illustrated in FIG. 25. For this purpose the frame of the ventilator sash is pivotally mounted on a pair of pivots 118 at its opposite sides, each of which is mounted at the end of an arm 119 extending through an appropriate slot in the window frame and fixed to a pipe 120 mounted in surrounding relation to the spring 105 and the shaft 35. At their inner ends the pipes 120 are connected to short connecting pipes 121 of reduced diameter, at the inner ends of each of which there is mounted a gear 122. The shaft 35 extends on through the gear and is connected to the opposed shaft by the connectors 38 and the worm gear 46 as previously described. The reduction in space thus afforded provides room for a pinion stem 123 which carries a pair of pinions 124 respectively engaged with the gears 122 whereby the entire hopper ventilator may be opened by pulling on one vertical edge, without twisting the ventilator frame.

At one vertical edge the ventilator frame is provided with a handle 130 adjacent which there is provided a thumb release lever 131. This lever is pivotally connected to a link 132 which is connected to a ratchet dog 133 mounted upon the pivot 118. The dog is in position to engage a ratchet 134 mounted on the ventilator frame whereby the extent of opening movement may be fixed. At the lower edge of each side of the frame there is mounted a guide wheel 135 which runs between the flange surface 71 and the rib 72 of the window frame, being thereby guided for vertical movement, forcing the arms 119 to swing outwardly as the ventilator is opened and removing the lower portion of the ventilator from engagement with the removable sill plate. The sill plate may now be removed to permit association of the crank with the driving gear 45 whereby the window sash may be operated as previously described.

A window unit of FIGS. 29 and 30 forming an alternate embodiment of the invention includes a unitary window frame 210 including a sill member 212, side members 214 and 216 and top member 218 secured in opening 220 in building wall 222. The side members have opposed, parallel, vertical guideways 224 and 226 at the upper portions thereof, and follower nuts 228 and 230 are keyed to and slidable along the guideways 224 and 226, respectively, and are movable identically up and down the guideways by leadscrews 232 and 234, respectively. The leadscrews are mounted by bearings 236 and 238 for rotation and against endwise movement, and are interconnected by bevelled gears 239 and 240, a shaft 242 and bevelled gears 244 and 246. The shaft 242 is mounted in bearings 248 carried by hollow top member 218 of the window frame. The threads of the nuts 228 and 230 and the screws 232 and 234 all have the same pitch and extend in the same direction, and the screws are rotatable in the same direction and speed by the interconnecting shaft and bevelled gears. As a consequence, each nut moves upwardly or downwardly identically with the other nut. A shaft 260 carried by bearing 262 may be rotated in either direction by crank 264 to drive the lead screw 232 through bevelled gears 266 and 268 and thus drive the lead screw 234.

Allochirial, scissors linkages 270 and 272 support flanged sash frame 274 from the window frame 210 at the sides thereof. The linkages are identical except for being handed, and only the linkage 270 will be described in detail. The linkage 270 includes levers 276 and 278 pivoted together by pin 280. Pin 282 fixed to side member 214 of the window frame mounts the lower end of the lever 276 pivotally, and pin 284 mounted in a fixed position on the sash frame connects the lower end of the lever 278 to the lower end of the sash frame. The upper end of the lever 278 is connected pivotally to the follower nut 228 by pin 286, and the upper end of the lever 276 is closely and slidingly connected to the upper end of the sash frame by a pin or roller 288 fixed to the lever 276 and fitting closely in one of vertical guideways 290 formed in the upper portions of the sides of the sash frame 274. The linkage 272 is similarly connected to the window frame and sash frame. The linkages are interconnected so as to be driven together as a unit. That is, movement of one of the linkages is always accompanied by identical movement of the other linkage so that the linkages may be described as parallel linkages, and the linkages always hold the sash frame without twist of the sash frame. Consequently, the sash frame may be as large as and as long as desired without danger of breakage to window pane 294 from twist of the sash frame during opening or closing of the window.

The sash frame 274 is adapted to be sealed to the window frame 210 in various ways. For example, a weatherstripping or sealing strip 298 may be provided on flange 299 for engaging face 297 of the window frame. Another excellent sealing construction is to have frame member 296 of the sash overlap and project into the window frame, together with a sealing strip (not shown) positioned on the portion of the window frame that forms the window opening.

A window unit shown in FIG. 31 and forming an alternate embodiment of the invention includes a window frame 310 having side frame members 312 and a flanged sash frame 314 supported by two parallel, scissors linkages 316 for movement between a closed position fitting in the window frame and an open position positioned into the building away from the window frame. The linkages 316 are positioned at opposite sides of the window and sash frames and each comprises levers 320 and 322 pivotally interconnected by a pin 324. The lower ends of the levers are pivotally connected to pins 326 and 328 fixed to the window frame and sash frame, respectively. The two linkages 316 are always kept parallel by interlocking or interconnecting coupling structure comprising chains 330 coursing over idler sprockets 332 mounted on pins 334 fixed to the sides of the window frame, sprockets 336 and the shaft 338, which extends along hollow top frame member 340. The sprockets 336 are keyed to the shaft 338. Guide pins or rollers 340 and 342 carried by the upper ends of the levers 322 and 320, respectively, closely and slidably fit into vertical guideways 344 and 346, respectively, of the sides of the window and sash frames. The upper ends of the levers 322 are fixed pivotally to identical points on outer courses of the chains 330, which outer courses extend parallel to the paths of the centers of the rollers 340. A counter-balancing tension spring 350 is secured at its lower end to a bracket 352 fixed to the window frame and is connected by a hook 351 to a point on the inner course of one of the chains 330. If desired, there may, of course, be two of the springs 350 each connected to one of the chains, but since the chains are coupled together for identical movement only one spring need be provided. Also, instead of the spring 350 being connected to the window frame, the lower end of the spring 350, if desired, may be connected to the lever 320 at a point thereon between the pins 324 and 326 to increase the counter-balancing effect of the spring.

The sash frame 314 is provided with a handle 354 for opening and closing the window. Since the coupled linkages 316 prevent twist of the sash frame, the handle may be located at any point around the sash frame.

Having illustrated and described several different embodiments of the present invention, it should be appreciated that various other modifications in detail are within the scope of the invention. All such modifications as come within the true spirit and scope of the following claims are considered to be a part of my invention.

I claim:

1. A window unit for mounting in a wall of a room comprising a rectangular sash frame having a top, bottom and sides,
   a rectangular window frame surrounding said sash frame and having a top, bottom and sides,
   said window frame including a fixed top flange and fixed side flanges respectively in overlapping relation with the top and sides of said sash frame when the window is closed,
   the bottom of said window frame comprising a removable sill plate,
   a pair of linkages pivotally connected to said sash frame respectively at the opposite lower sides thereof and to said window frame respectively at the opposite lower sides thereof,
   said linkages extending vertically between the window frame and the sash frame when the window is closed,
   a pair of slides respectively guided for vertical movement in the sides of said window frame,
   a pair of pusher links respectively connected to said slides at one end and to the opposite upper sides of said sash frame at their other ends,
   said pusher links extending vertically between the window frame and the sash frame when the window is closed,
   a pair of vertical guide means respectively in the sides of said window frame,
   a pair of guide wheels respectively mounted on the upper sides of said sash frame and guided in said guide means,
   mechanical driving means mounted in said window frame for simultaneously and coextensively raising or lowering said slides,
   crank means connectable to said driving means when said sill plate is removed,
   initial operation of said crank means in one direction causing vertical lowering of said pusher links whereby the top of said sash frame is lowered vertically, thereby causing extension of said linkages into the room whereby the bottom of said sash frame is pushed inwardly of the room,
   and a pair of switch means respectively on the sides of said window frame for disengaging said guide wheels from said guide means inwardly of the room during the downward movement of said slides,
   subsequent operation of said crank means in the opposite direction causing vertical raising of said slides whereby said pusher links are caused to swing inwardly of the room to push the top of the sash frame inwardly until the sash frame assumes a vertical position spaced inwardly from the wall.

2. A window unit for mounting in a wall of a room comprising a rectangular sash frame having a top, bottom and sides,
   a rectangular window frame surrounding said sash frame and having a top, bottom and sides,
   said window frame including a removable sill member,
   a pair of scissors linkages pivotally connected to said sash frame respectively at the opposite lower sides thereof and to said window frame respectively at the opposite lower sides thereof,
   said scissors linkages when collapsed extending vertically between the window frame and the sash frame when the window is closed,
   a pair of slides respectively guided for vertical movement in the sides of said window frame,
   a pair of pusher links respectively connected to said slides at their lower ends and to the opposite upper sides of said sash frame at their upper ends,
   said pusher links extending vertically between the window frame and the sash frame when the window is closed,
   a pair of vertical guide means respectively in the sides of said window frame,
   a pair of guide wheels respectively mounted on the upper corners of said frame and guided in said guide means,
   mechanical driving means mounted in said window frame for simultaneously and coextensively raising or lowering said slides,
   crank means connectable to said driving means when said sill member is removed,
   initial operation of said crank means in one direction causing vertical lowering of said pusher links whereby the top of said sash frame is lowered vertically, thereby causing extension of said scissors links into the room whereby the bottom of said sash frame is pushed inwardly of the room, and a pair of switch means respectively associated with said guide means for disengaging said guide wheels from said guide means inwardly of the room during the last part of the downward movement of said slides, subsequent operation of said crank means in the opposite direction causing vertical raising of said slides whereby said pusher links are caused to swing inwardly of the room to push the top of the sash frame inwardly until the sash frame assumes a vertical position spaced inwardly from the wall.

3. A window unit for mounting in a wall of a room comprising a rectangular sash frame having a top, bottom and sides, a rectangular window frame surrounding said sash frame and having a top, bottom and sides, said frames respectively including flanges in overlapping relation with each other to weather seal the window when closed, said window frame including a removable sill member, a pair of scissors linkages pivotally connected to said sash frame respectively at the opposite lower sides thereof and to said window frame respectively at the opposite lower sides thereof, said scissors linkages when collapsed extending vertically between the window frame and the sash frame when the window is closed, a pair of slides respectively guided for vertical movement in the sides of said window frame, a pair of pusher links respectively connected to said slides at their lower ends and to the opposite upper sides of said sash frame at their upper ends, said pusher links extending vertically between the window frame and the sash frame when the window is closed, a pair of vertical guide means respectively in the sides of said window frame, a pair of guide members respectively mounted on the upper sides of said frame and guided in said guide means, mechanical driving means mounted in said window frame for simultaneously and coextensively raising of lowering said slides, crank means connectable to said driving means when said sill member is removed, initial operation of said crank means in one direction causing vertical lowering of said pusher links whereby the top of said sash frame is lowered vertically, thereby causing extension of said scissors links into the room whereby the bottom of said sash frame is pushed inwardly of the room, and a pair of switch means respectively on the sides of said window frame and associated with said guide means for disengaging said guide members from said guide means inwardly of the room toward the end of the downward movement of said slides, subsequent operation of said crank means in the opposite direction causing vertical raising of said slides whereby said pusher links are caused to swing inwardly of the room to push the top of the sash frame inwardly until the sash frame assumes a vertical position spaced inwardly from the wall.

4. The structure set forth in claim 3 wherein said mechanical driving means comprises a shaft rotatively mounted in the bottom of said window frame and extending from side to side thereof, a pair of sprocket chains respectively mounted in the sides of said window frame and operatively connected to said slides, a driving gear fixed to said shaft, and crank means separably mountable on the lower part of said window frame and including a gear adapted to mesh with said driving gear.

5. The construction set forth in claim 3 wherein said window frame includes a hopper ventilator pivotally mounted in the lower part thereof, said ventilator having an upper flange engageable with the lower part of said sash frame and a lower flange engageable with said sill plate for sealing the window when said ventilator and window are closed.

6. The construction set forth in claim 3 wherein said window frame includes a hopper ventilator pivotally mounted in the lower part thereof, said ventilator having an upper flange engageable with the lower part of said sash frame and a lower flange engageable with said sill plate for sealing the window when said ventilator and window are closed, and means to raise the lower portion of said ventilator when opened to permit removal of said removable sill plate.

7. A window unit for mounting in a wall of a room comprising a rectangular sash frame having a top, bottom and sides, a rectangular window frame surrounding said sash frame and having a top, bottom and sides, said window frame including a fixed top flange and fixed side flanges respectively in overlapping relation with the top and sides of said sash frame when the window is closed, the bottom of said window frame comprising a removable sill plate, a pair of linkages pivotally connected to said sash frame respectively at the opposite lower sides thereof and to said window frame respectively at the opposite lower sides thereof, said linkages extending vertically between the window frame and the sash frame when the window is closed, a pair of slides respectively guided for vertical movement in the sides of said window frame, a pair of pusher links respectively connected to said said slides at one end and to the opposite upper sides of said sash frame at their other ends, said pusher links extending vertically between the window frame and the sash frame when the window is closed, a pair of vertical guide means respectively in the sides of said window frame, a pair of antifriction guide members respectively mounted on the upper sides of said sash frame and guided in said guide means, mechanical driving means mounted in said window frame for simultaneously and coextensively raising or lowering said slides, operating means connectable to said driving means when said sill plate is removed, initial operation of said operating means in one direction causing vertical lowering of said pusher links whereby the top of said sash frame is lowered vertically, thereby causing extension of said linkages into the room whereby the bottom of said sash frame is pushed inwardly of the room, and a pair of switch means respectively on the sides of said window frame for disengaging said antifriction guide members from said guide means inwardly of the room during the downward movement of said slides, subsequent operation of said operating means in the opposite direction causing vertical raising of said slides whereby said pusher links are caused to swing inwardly of the room to push the top of the sash frame inwardly until the sash frame assumes a vertical position spaced inwardly from the wall.

8. In a window unit, a window frame having a pair of vertical side members provided with vertical guideways in the upper portions thereof, a pair of lazy tong linkages each including a first lever and a second lever pivotally connected to the first lever intermediate the ends thereof, a pair of pin means connecting the lower ends of the second levers to the lower ends of the side members, a pair of guide means carried by the upper ends of the first levers and guided along the guideways in the upper portions of the side members, a pair of endless chains, a shaft extending from one side member to the other, a pair of first sprockets keyed to the shaft and meshing with the chains, a pair of idler sprockets carried by the side members below the first sprockets and guiding the chains, means connecting one course of the chains to the upper ends of the first levers, counter-balance means connected to the other course of one of the chains, a sash frame having sides provided with vertical guideways at the upper portions thereof, a pair of pin means connecting the lower ends of the first levers pivotally to the lower ends of the sides of the sash frame, and a pair of guide means connecting the upper ends of the second levers pivotally and slidably to the guideways of the sash frame.

9. In a window unit, a window frame having opposed sides and a passage extending from one side to the other side, a shaft extending through the passage, a first pair of parallel, scissors levers, a second pair of parallel, scissors levers pivotally connected at the central portions thereof to the central portions of the first pair of parallel scissors levers, means connecting the same end of each of the first pair of parallel, scissors levers to the opposed sides of the frame for pivotal movement thereof about a single axis fixed relative to the window frame, a window sash, means for connecting the other ends of the first pair of parallel, scissors levers pivotally and slidably to opposite sides of the window sash, means for connecting the same end of each of the second pair of levers to the opposite sides of the sash for pivotal movement thereof about a single axis fixed relative to the window sash, means for connecting the other ends of the second pair of parallel, scissors levers pivotally and slidably to the opposed sides of the window frame, a pair of coupling means interlocking one of the pairs of levers to opposite ends of the shaft to hold the levers of said one of the pairs thereof in parallel positions, and spring means coupling at least one of the levers and the frame and urging the last-mentioned lever in a predetermined direction relative to the frame.

10. The window unit of claim 9 wherein each of the pair of coupling means comprises a first gear keyed to the shaft and a second gear driven by pivotal movement of one of the levers.

11. The window unit of claim 9 wherein each of the pair of coupling mechanisms includes a first sprocket keyed to the shaft, a second sprocket mounted on the window frame and spaced from the first sprocket, a chain coursing over the sprockets, and means connecting one of said other ends of the second pair of parallel, scissors levers to the chain to move the chain and turn the shaft as said other ends of the second pair of parallel, scissors levers more relative to the window frame.

12. In a window unit, a window frame having a pair of parallel side housing portions open at one side of each and a horizontal cross housing portion extending between the ends of the side housing portions, a sash frame adapted when in closed position to fit into and when in open position to be located out of the window frame and having side flange portions adapted to close the open sides of the side housing portions when the sash frame is closed, a shaft mounted rotatably in and extending along the tubular cross housing portion, a pair of scissors linkages secured to the window frame and the sash frame and adapted to fit into the side housing portions when the sash frame is in its closed position, a pair of coupling mechanisms connecting the linkages drivingly to the shaft to synchronize the movements of the linkages, and spring means in one of the side housing portions connected to the window frame and one of the linkages and tending to move the sash frame toward its closed position.

13. In a window unit, a window frame having a pair of side housing portions open at one side of each and a horizontal cross housing portion extending between the ends of the side housing portions, a sash frame adapted when in a closed position to fit into the window frame and when in an open position to be located out of the window frame and having side flange portions adapted to close the open sides of the side housing portions when the sash frame is closed, a shaft mounted rotatably in and extending along the cross housing portion, a pair of linkages secured to the window frame and the sash frame and adapted to fit into the side housing portions when the sash frame is in its closed position, a pair of reversible coupling mechanisms connecting the linkages drivingly to the shaft to synchronize the movements of the linkages and for rotating the shaft by movement of the linkages by the sash frame, and counterbalancing means in one of the side housing portions coupled to the window frame and one of the linkages.

References Cited by the Examiner

UNITED STATES PATENTS

| 1,257,535 | 2/18 | Sampson | 160—165 |
| 1,619,167 | 3/27 | Tuomi | 20—42 |
| 2,374,618 | 4/45 | Perreton | 20—40 |
| 2,636,727 | 4/53 | Toth | 268—21 |

FOREIGN PATENTS

| 301,001 | 9/32 | Italy. |

HARRISON R. MOSELY, *Primary Examiner.*